115,880

UNITED STATES PATENT OFFICE.

CHARLES McBURNEY, OF BOSTON, MASSACHUSETTS.

IMPROVEMENT IN FINISHING VULCANIZED INDIA-RUBBER BELTINGS.

Specification forming part of Letters Patent No. 115,880, dated June 13, 1871.

*To all whom it may concern:*

Be it known that I, CHARLES McBURNEY, of Boston, in the county of Suffolk and State of Massachusetts, have invented an Improvement in the Process of Finishing Vulcanized India-Rubber Belting, of which the following is a full and accurate description.

Rubber belting is made of several alternate thicknesses of heavy cotton duck and of well-known vulcanizable rubber compounds. In the ordinary process of manufacture the duck is first coated on both sides with such compound by means of heavy steam-heated rolls, the duck being unavoidably stretched to its utmost capacity during this operation. The sheet of duck thus coated is cut into strips of the desired widths, and these are folded together into belts, which are firmly united, owing to the adhesive nature of the vulcanized rubber, by pressure between rolls, to prepare them for vulcanization, which is effected in a large iron cylinder, the belts being run into and out of the same upon a suitable carriage constructed for the purpose.

The carriage preferred has, besides the bottom, which serves for a shelf, one or more additional shelves on which to lay the belts folded in lengths, one above another. Thus laden the carriage is run into the cylinder, the end of which is afterward closed. Steam is then introduced through pipes having valves by which to regulate the degree and duration of heat, which is usually from 240° to 255° Fahrenheit, continued for several hours. This process is always attended with such contraction of the duck that the belt, when put to use, stretches, and requires to be shortened, sometimes repeatedly.

The purpose of my invention is, while finishing belting more perfectly and uniformly vulcanized than can be done in any other manner known to me, to obviate the difficulty referred to, and utilize from four to five per cent. in length of belting heretofore wasted after being stretched for use. I do this by successively heating, stretching, and cooling the belting after it has been vulcanized in the manner described, using for the purpose the following apparatus: First, an iron cylinder, about twenty feet in length by four feet in diameter, having in each end or head a horizontal opening thirty-four inches wide by four inches in height, and above and below these openings steam-tubes or pipes running lengthwise through the cylinder, much as in the ordinary tubular boiler. Second, a pair of heavy, smooth, metallic plates, of the same length of the cylinder, placed nearly contiguous thereto, and on a level with the openings therein; said plates being adjusted with screws, by which they are separated and brought together. Third, two sets of clamps, firmly fixed on a level with the plates, at an interval from each other of about forty feet, within which stand the cylinder and plates. Taking the coil or coils of belting—for as many belts of the same thickness as can lie side by side within the width of the plates may be treated at the same time as they come from the cylinder in which they were vulcanized—I pass about twenty feet of each piece of belting through the first set of clamps, and through the opening in the cylinder, previously heated by steam transmitted from a steam-boiler, into the said tubes or pipes. The openings in the cylinder ends I then close with bags of sand or by other convenient means, leaving the inclosed section of the belting exposed to the heat for from five to ten minutes, which softens it and renders it more flexible. This done, I remove the sandbags and slide the belting along between the plates, which are in a cold state, and the second set of clamps. Both sets of clamps I then close firmly upon the belting, which, by means of a screw attached to one set, I stretch to the extent of about a half inch to the foot. The cold plates I then screw firmly together upon the belting while still heated and on the stretch, for the purpose of finally cooling, settling, and consolidating the same. This operation I repeat until the entire belting has passed through the plates, heating and cooling two successive lengths simultaneously. By thus heating, stretching, and cooling the belting it will not stretch after being put to use, and the necessity of its being frequently taken up and shortened, as heretofore, is avoided.

I do not confine myself to the use of the apparatus above referred to, as any other which will effect the desired end may be employed, if preferred.

Vulcanization of rubber belting in the manner described, and afterward smoothing it between heated metallic plates, are old and well-known processes, to which I lay no claim; but

What I claim as my invention, and desire to secure by Letters Patent, is—

The within-described process of successively heating, stretching, compressing, and cooling the belting after it has been vulcanized, substantially as and for the purpose set forth.

Witness my hand this 13th day of March, A. D. 1871.

CHARLES McBURNEY.

Witnesses:
P. E. TESCHEMACHER,
N. W. STEARNS.